Oct. 31, 1961 G. W. YARBER 3,006,696
BRAKE CONTROL SYSTEM WITH PRESSURE MODULATION
Filed Dec. 23, 1957 2 Sheets-Sheet 1

GORDON W. YARBER,
INVENTOR.

BY
Barkelew + Lewis

United States Patent Office 3,006,696
Patented Oct. 31, 1961

3,006,696
BRAKE CONTROL SYSTEM WITH
PRESSURE MODULATION
Gordon W. Yarber, % General Delivery, Cornell, Calif.
Filed Dec. 23, 1957, Ser. No. 704,364
33 Claims. (Cl. 303—24)

This invention has to do with fluid actuated brake systems.

The invention is particularly advantageous in systems which include skid-control mechanisms acting to relieve the brake in response to an incipient skid of the braked wheel.

The invention relates to brake control systems in which the braking action is controlled by the pressure of a fluid medium, whether that medium be a liquid as in the many well-known types of hydraulic brake systems, or whether the medium be a gas such as air.

The invention is useful for improving the brake control action of such systems in all types of vehicle. However, the invention provides additional advantages which are particularly important in connection with brake control systems for the landing wheels of aircraft. For that reason the invention will be described largely as it pertains to that particular field of use, but without thereby implying any limitation of its scope.

Anti-skid brake control systems are well known which automatically release the wheel brake in response to abnormal deceleration of the wheel, such deceleration indicating an incipient skid condition. Systems are also known which initially relieve the brake in response to a first skid signal; and fully release the brake only if that initial action proves insufficient to check the incipient skid. An important problem in such previous systems is that, following recovery of the wheel from its skid condition, the brake pressure is usually returned promptly to its previous value, tending to initiate another skid.

One important object of the invention is to provide means for modulating the braking pressure metered by the operator of the vehicle in a manner to insure increase of braking action at a predetermined limited rate, thereby reducing the possibility of the pressure overshooting the maximum effective value and initiating a skid. Furthermore, the invention provides such modulating action without causing appreciable delay in delivering to the brake sufficient volume of fluid to initiate braking action.

A further important object of the present invention is to provide means for gradual reapplication of the brake following recovery from a skid condition. Such gradual reapplication of brake pressure allows time for the wheel and landing gear to return to normal performance and for the anti-skid control system to reach equilibrium. During such gradual reapplication of the brake, repetition of the previous skid is unlikely, so that the average braking effectiveness is appreciably increased. Moreover, when the pilot continues to meter to the brakes an excessive pressure, tending to cause periodic skidding of the wheel, such gradual reapplication of the brakes as is provided by the present invention greatly reduces the frequency of such skid action. The possibility of resonant deformation of the aircraft landing gear is thereby greatly reduced.

The invention provides means by which it is possible to modulate reapplication of the brakes in an effective and reliable manner under control of limited fluid flow through a restricted orifice. It has been found difficult with some brake types to obtain satisfactory performance with such a limiting orifice placed directly in series with the brake, since the differential pressure across such an orifice during control action is typically high, and since the volume of fluid flow for such direct control action may be extremely small. Those difficulties are completely avoided, in accordance with one aspect of the present invention, by providing a control valve of pressure-regulating type which supplies fluid pressure to the brake line in accordance with an applied force. That force is applied by means of mechanism which involves a time delay, typically produced by fluid flow through a limiting orifice. A particular advantage of the invention is that the volume of fluid flow required to produce a given change in brake pressure can readily be made relatively high; whereas the differential pressure across the orifice is typically far smaller than the input fluid pressure that is to be modulated. As a result, the apparatus of the invention may be relatively rugged in its design and entirely reliable in its operation.

The invention further provides means by which, following skid-correcting action of the control system, the brake pressure may be returned promptly to an intermediate value which is only slightly less than the pressure at which the incipient skid occurred. The brake pressure is then preferably raised from that value at a limited rate under control of the modulating mechanism.

Furthermore, the mechanism of the invention typically regulates the intermediate value to which the pressure is thus promptly returned in accordance with the severity of the incipient skid that has just been corrected. The greater the severity of that skid, the greater is the difference between the pressure at which that skid took place and the pressure to which the brake is promptly returned following recovery from that skid.

In preferred form of the invention all of the valve functions required for complete skid-preventing control and for the described pressure modulation are coordinated in a unitary and compact structure. Such coordinated structure permits a wide variety of interrelated functions to be provided. Among such functions, for example, are the gradual and controlled decrease of braking pressure during an initial skid signal, followed by complete release of the brake in response to a second signal. As a further example, the intermediate pressure which is promptly applied to the brake before modulating action commences may be caused to vary automatically under control, for example, of the pressure metered by the operator of the vehicle.

A full understanding of the invention, and of its further objects and advantages, will be had from the following description of certain illustrative embodiments. The accompanying drawings form a part of that description, which is intended only as illustration and not as a limitation upon the scope of the invention.

Figure 1:
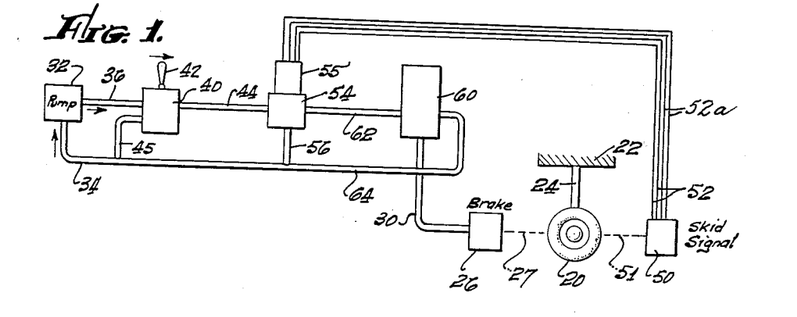
FIG. 1 is a schematic drawing representing an illustrative fluid-operated brake control system incorporating the invention.

FIG. 1 represents in schematic form a brake control system in accordance with one embodiment of my invention. A braked vehicle wheel is indicated at 20, mounted on a vehicle frame 22 by means of support structure 24, which may, for example, represent the landing gear of an aircraft. For clarity of description and without implying any limitation of scope of the invention, the invention will be described primarily as it relates to the control of aircraft landing wheel. A brake for wheel 20 is indicated schematically at 26, and is connected mechanically to the wheel in conventional manner as represented by the dashed line 27. Brake 26 is of fluid-actuated type and will be considered for purposes of the present description to be controlled by a liquid fluid. Systems utilizing pneumatic brakes will be described later. The brake itself may be of any suitable type and typically applies to wheel 20 a braking torque corresponding to a fluid pressure supplied to the brake via the brake line 30.

Pressurized fluid for actuating brake 26 is supplied from a pressure source of any suitable type, indicated schematically as a hydraulic pump 32. Pump 32 delivers pressurized fluid via pressure line 36 and receives return fluid at low pressure via the return line 34. Pressure from line 36 is metered to the brake by any suitable type of valve structure, shown schematically as a conventional metering valve 40 with control handle 42. Metering valve 40 typically supplies fluid to supply line 44 under a pressure which corresponds to the force exerted on handle 42 by the pilot. That force is typically applied to handle 42 via mechanism of known type by the pilot's feet. As the force on handle 42 is released by the pilot, the pressure in supply line 44 is correspondingly reduced by release of fluid via line 45 to low pressure return line 34.

The present aspect of the invention is concerned particularly with brake control systems which include mechanism of known type for relieving the pressure at the brake automatically under conditions tending to produce a wheel skid. For example, a sensing mechanism responsive to an incipient skid of wheel 20 is indicated schematically at 50. Skid sensing mechanism 50 is driven in accordance with the rate of wheel rotation, as by the mechanical linkage represented by the dashed line 51. Sensing mechanism 50 is typically responsive to wheel deceleration, and develops one or more electrical signals whenever the rate of wheel deceleration reaches an abnormally high value. Typically two skid signals are produced on the lines 52 and 52a, respectively, and are supplied to a skid-control valve mechanism, shown schematically at 54 with electro-responsive actuating means 55. Valve 54 is connected between supply line 44 and brake line 30, normally providing substantially free communication between those lines. In response to a skid signal on lines 52, actuator 55, which may comprise a solenoid mechanically linked to valve structure 54, typically causes the valve to cut off brake line 30 from supply line 44, thereby preventing further increase in the braking pressure. Valve 54 may also respond to a signal on lines 52a to release the pressure in brake line 30, as via the conduit 56, to low pressure return line 34, thereby releasing the brake.

Some anti-skid brake control systems fully release the brake in response to the initial skid signal. I prefer, however, to provide valve means 54 which relieve the brake pressure only partially in response to an initial skid signal, and which fully release the brake only in response to continuation or increase of the signal or to an additional signal supplied by sensing means 50. Illustrative structures which may be utilized as sensing mechanism 50 and skid control valve 54 are described, for example, in my copending patent application entitled "Brake Control System"—Serial Number 550,351, filed December 1, 1955, now Patent No. 2,914,359.

In accordance with the present aspect of my invention, a pressure modulating valve is provided in the pressure line between skid control valve 54 and brake 26. Such a pressure modulating valve is represented at 60 in FIG. 1. It receives pressure via input line 62 from the outlet side of anti-skid valve 54, and supplies fluid at modulated pressure to the brake via brake line 30. A connection is also provided from modulating valve 60 to low pressure return line 34, as via the return line 64. Although valve 60 is shown and will be described illustratively as a separate unit from skid control valve 54, the two mechanisms may, if desired, be constructed as a single unit.

Modulating valve 60 typically transmits to brake line 30 the pressure standing in input line 62 under equilibrium conditions of the system, but modulates that pressure in a particularly favorable manner when the input pressure increases. The pressure modulation provided by valve 60 is particularly important during those phases of the operating cycle when the supply pressure is increasing rapidly. When the brake is first applied, pressure in input line 62 typically increases rapidly. Under that condition valve 60 preferably permits the pressure supplied to brake line 30 to increase correspondingly only to a predetermined critical value, which is high enough to initiate braking action but is unlikely to produce a skid. Thereafter the brake pressure is permitted to increase only at a limited and relatively low rate.

When the pressure in input line 62 is reduced sharply, whether by release of pressure from control handle 42 or from brake releasing action of anti-skid valve 54, pressure modulating valve 60 transmits that reduction of pressure promptly and fully to brake line 30, thereby relieving the brake without delay. In typical skid-preventing action of valve 54, such reduction of the braking pressure for a small fraction of a second is often sufficient to prevent a skid and restore the wheel to normal rotation. Anti-skid valve 54 then restores to input line 62 the pressure standing in supply line 44, which pressure corresponds to the pilot's force on handle 42. Under that condition, pressure regulating valve 60 of the present invention, in its preferred form, causes the pressure in brake line 30 to increase rapidly to a value which is greater than the critical value mentioned above, and is typically only slightly less than the braking pressure at which the incipient skid was just previously initiated. Further increase in pressure supplied to brake line 30 is then permitted by valve 60 only at a limited and predetermined rate. That action has the great advantage of restoring the brake to effective operation promptly after recovery from an incipient skid, and at the same time prevents overshooting of the pressure to a value which might quickly cause another incipient skid. Even when the pilot continues to meter a pressure which is excessive under the existing conditions of runway and wheel loading, that pressure is not immediately transmitted to the brake, but is modulated in such a way as to cause the braking force to build up gradually. If that force, nevertheless, reaches a value at which an incipient skid is initiated, its rate of increase is sufficiently slow that the anti-skid control system is able to cope efficiently with the situation and prevent a skid from developing.

The described gradual increase of brake pressure thus tends to lengthen the periods of effective braking action between successive incipient skids. That has the obvious advantage of increasing braking efficiency. In the control of aircraft brakes, it has the further important advantage of lowering the effective frequency of actuation of the anti-skid control, thereby greatly reducing the possibility of resonant oscillation of the landing gear structure in response to the intermittent brake action.

Figure 2:
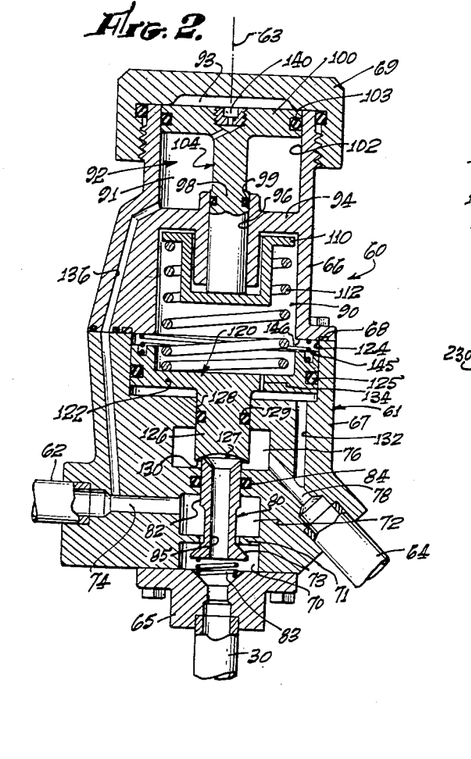
FIG. 2 is an axial section representing an illustrative pressure-modulating mechanism in accordance with one aspect of the invention.

An illustrative pressure modulating valve 60 in accordance with the present aspect of the invention is illustrated somewhat schematically in axial section in FIG. 2. As there shown, the valve structure comprises a main housing 61 with longitudinal axis 63. The structure is shown with axis 63 vertical, and will be so referred to for convenience of description, although that orientation is not necessary. Housing 61 comprises upper and lower primary portions 66 and 67 with suitable sealing means 68 between them. Upper member 66 is closed by the threaded cap 69; and lower member 67 is closed by the fitting 65, to which brake line 30 is connected. Housing 61 encloses a series of coaxial chambers. The lower-most chamber 70 will be referred to as the outlet chamber, and communicates directly with brake line 30. Directly above outlet chamber 70 is the inlet chamber 72 which communicates via the transverse passage 74 with input line 62. Above inlet chamber 72 is the relief chamber 76 which communicates via the oblique transverse passage 78 with relief line 64. An axial passage between relief chamber 76 and inlet chamber 72 fittingly receives the cylindrical portion 82 of the axially reciprocable valve member 80, for which it acts as a guideway. Valve member 80 extends downwardly through inlet chamber 72 and thence through an axial passage into outlet chamber 70. The radial flange 71 in that passage provides a valve seat for the flared lower end of valve member 80, forming the valve 73. Upward movement of valve member 80 is lightly urged by the coil spring 83. That movement closes valve 73, cutting off communication between inlet chamber 72 and outlet chamber 70.

Communication between inlet chamber 72 and relief chamber 76 along the exterior face of valve member 80 is prevented by suitable sealing means, indicated at 84. An axial through bore 85 in valve member 80 provides communication between outlet chamber 70 and relief chamber 76 whenever the upper end of the valve member is uncovered. The valve member is normally covered at its upper end, and its axial position is partially determined, by structure now to be described.

Above chamber 76 in housing 61 are the relatively large cylindrical spring chamber 90 and the cylindrical control chamber 92. Chambers 90 and 92 are separated by a web structure 94 which has an axial through bore 96 in which the control piston 98 is slidingly received. Suitable sealing means 99 are provided between piston 98 and its cylinder wall 96. The modulating piston 100 slidingly engages the cylindrical wall 102 of chamber 92, with sealing means 103. Pistons 98 and 100 are positively linked together with respect to their axial movement, by coupling mechanism of any suitable type, which may provide any desired relationship between their respective movements. The pistons, as illustratively shown, comprise an integral control member 104, and hence may be considered to be linked together by coupling mechanism having a 1:1 drive ratio. The effective working area of modulating piston 100 is preferably much larger than that of control piston 98, as illustratively shown in the drawing. The ratio of those areas may, for example be of the order of 10 to 1.

Spring chamber 90 contains resilient mechanism which is stressible under control of the input pressure from line 62. The compressible coil spring 112 is illustrative of such mechanism, which may comprise any resiliently yieldable body, for example an enclosed body of compressible gas between axially movable pistons, or a mecanical spring device adapted to be placed in tension or compression. Control piston 98 extends downwardly through bore 96 into spring chamber 90 where it abuts the upper face of the spring bracket 110. The coaxial coil spring 112 is mounted between spring bracket 110 and the valve actuating and damping member 120. Member 120 comprises an upper piston portion 122, which slidingly engages the cylindrical wall 124 at the lower end of spring chamber 90 with the sealing means 125; and the lower valve actuating plunger portion 126, which extends downwardly with sealing means 129 through the axial bore 128 in housing 61 into relief chamber 76. The lower end face 127 of plunger 126 engages the upper end of tubular valve member 80, normally closing the axial passage in that valve member.

Downward movement of plunger 126 causes valve 73 to open, providing communication between outlet chamber 70 and inlet chamber 72. Upward movement of plunger 126 permits valve member 80 to move upwardly under the force of spring 83 and thereby close valve 73, cutting off that communication. Further upward movement of plunger 126 lifts its lower face 127 away from valve member 80, providing communication via valve bore 85 between outlet chamber 70 and relief chamber 76. Those movements are controlled by the fluid pressures acting on the various parts, and by the yielding force exerted by spring 112 upon member 120. The magnitude of that force varies with the position of control piston 98, increasing as that piston moves downwardly to stress the spring.

In the present embodiment spring chamber 90 is maintained substantially at the pressure of return line 64, communication with that line being typically provided by a passageway in the housing indicated at 132. Pressure equalization on opposite faces of damping piston 122 is provided by the piston orifice 134. That orifice is preferably sufficiently large to permit prompt valve actuating movements of member 120, and yet is sufficiently restrictive to effectively aid the friction and inertia of the piston in damping vibratory movements of plunger 126, thereby preventing chattering of valve member 80 when either valve is slightly open.

Control pressure for operating control piston 98 is supplied to control chamber 92 from inlet passage 74, as by the passage shown at 136. That passage supplies fluid under the pressure of inlet line 62 directly to lower control chamber 91, below modulating piston 100. Chamber portion 93 above piston 100 is closed except for conduit means of any suitable type which provide limited fluid flow between the lower and upper sides of the piston, that is, between lower and upper chambers 91 and 93. Such conduit means may, for example, be constructed in the piston itself, as represented at 140. Orifice structure 140 is preferably adjustable during assembly of the device to produce between the upper and lower sides of piston 100 a predetermined degree of flow restriction which is appropriate to the type of use for which the particular pressure modulating valve is intended.

With regard to operation of the device, it may be noted that when valves 73 and 130 are both closed or substantially closed, pressure in inlet chamber 72 exerts substantially zero axial pressure upon valve member 80. Pressure in outlet chamber 70 also exerts substantially zero force on valve member 80, so that the position of the latter is controlled effectively by spring 83 and by the position of plunger 126. Spring 83 maintains valve member 80 in engagement with plunger 126, closing valve 130, unless upward movement of member 80 is prevented by closure of valve 73. The force of spring 83 is typically small compared to the hydrostatic forces to be described, but is sufficient to overcome the weight and friction of member 80.

Outlet pressure from chamber 70 acts on lower face 127 of plunger 126, tending to lift the plunger. That tendency is opposed by the downward force of spring 112. Thus the actual valve positions are determined by the balance of forces on plunger 126. Downward movement of the plunger maintains valve 130 closed and opens valve 73. Upward movement of the plunger closes valve 73 and then, if continued, opens valve 130. Since spring 83 does not contribute to the latter movement, the pressure on plunger face 127 required to open valve 130 is typically slightly greater than that required to close valve 73.

The downward force of spring 112 upon plunger 126 increases with the degree of stressing of the spring, which in the present embodiment results from spring compression. Since the axial movement of plunger 126 required for actuation of valves 73 and 130 is typically very small, the spring force depends substantially entirely upon the axial position of the upper end of the spring, which is controlled by action of control piston 98 and modulating piston 100.

Under equilibrium conditions of brake application, the degree of compression of spring 112 corresponds to the fluid pressure acting downward on control piston 98. The working face of piston 98 may be considered to be an area of the upper surface of piston 100 which is equal to the cross-section of piston 98. Under equilibrium conditions, the pressure acting on that face equals the inlet pressure, transmitted from inlet line 62 via passage 136 and orifice 140. The diameter of control piston 98 is typically approximately equal to the effective diameter of the working surface 127 of plunger 126 which is exposed to the fluid pressure of outlet chamber 70 when valve 130 is closed. That working surface in the present embodiment also corresponds substantially to the area of the opening at flange 71. With the described relationships, the modulating valve acts under equilibrium conditions to maintain braking pressure in brake line 30 substantially equal to the inlet pressure from line 62.

As the inlet pressure increases, increasing the pressure in portions 91 and 93 of control chamber 92, control piston 98 is urged downwardly, tending to compress spring 112. However, the rate at which such compression can increase is limited by the flow of fluid through orifice 140. Hence the brake pressure typically increases more slowly than the inlet pressure. The degree of lag of brake pressure behind inlet pressure may be considered to result from two distinct effects, either one of which might be utilized alone to produce useful action of the present type.

For one thing, the working face of control piston 98 is effectively an area of the upper surface of member 104 which is equal to the cross-section of piston 98. Since that working face is exposed to pressure in upper chamber 93, the downward pressure on piston 98 depends upon pressure in chamber 93 rather than in lower control chamber 91. As member 104 moves downward, that working pressure can be maintained and increased only as flow through orifice 140 fills the increasing volume of upper chamber 93. The required volume of flow through orifice 140 therefore equals the working area of piston 100 multiplied by the distance it moves. That volume is variable within wide limits in design of the mechanism. For example, the volume of flow per unit increase of spring force may be increased by increasing the area of piston 100 or by employing a softer spring.

In the second place, any pressure differential capable of moving fluid upward through orifice 140 also causes an upward force on piston 100. The effective working area of piston 100 is its total area less the described working face of control piston 98. Since that effective area of modulating piston 100 is typically very considerably larger than the area of control piston 98, even a relatively small pressure excess below piston 100 can completely compensate the force developed by control piston 98. Actually, however, the latter force is opposed also by the upward force of spring 112 upon bracket 110. Hence, the pressure differential available to move fluid upward through orifice 140 is approximately that necessary to produce an upward force on piston 100 equal to the downward force developed by piston 98 less the force of spring 112. That available differential pressure is typically a small fraction of the total inlet pressure in lower chamber 91.

In idle condition of the system, with the brake released, the fluid pressure throughout modulating valve 60 typically equals the pressure of return line 64. Spring 112 is preferably pre-stressed sufficiently to hold control piston 98 at the top of its stroke, to maintain valve 130 closed and valve 73 open, and to resist upward movement of plunger 126 with a definite predetermined force. When braking pressure is initially supplied from the pilot's metering valve 40 to apply the brake, the increasing inlet pressure is transmitted substantially freely to outlet chamber 70 and to the brake, initiating light braking action at once. The resulting pressure in outlet chamber 70 exerts upward force on plunger 126, which soon becomes sufficient to overcome the pre-stressing of spring 112, tending to compress that spring and close valve 73, preventing further rapid increase of braking pressure. The rapid initial build-up of brake pressure is particularly desirable in brakes that require inflow of an appreciable volume of fluid to initiate brake application.

The increasing inlet pressure is simultaneously transmitted via passage 136 to lower control chamber 91, and via orifice 140 to upper chamber 93. As the pressure above piston 100 builds up, the resulting downward force upon control piston 98 does not produce actual downward movement of member 104 until it exceeds the upward force exerted by prestressed spring 112. During that initial phase of the pressure build-up in upper chamber 93, orifice 140 causes only negligible delay in the rate of pressure increase, due to the very small volume of fluid required to increase pressure under static conditions. Hence downward movement of control member 104 is initiated at substantially the same time that the inlet pressure exceeds a critical value corresponding to the selected degree of prestressing of spring 112.

As the inlet pressure increases above that critical value, control piston 98 moves downwardly at a limited rate, further stressing spring 112. During that phase of the action, the pressure in outlet chamber 70 is not determined directly by the pressure in inlet chamber 72, but is modulated by valve 73 in accordance with the gradually increasing force exerted by spring 112 upon plunger 126. Due to the resilience of the spring, even a small increase in the spring force, and hence in the outlet pressure, requires an appreciable downward movement of the upper end of the spring. Piston 98 thus moves progressively downward, each position of the piston corresponding to a particular equilibrium value of the outlet pressure.

At each point of the downward movement of the control piston the forces upon it are substantially in equilibrium. That approximate relation may be expressed by the equation:

$$F = a(P-D) - AD \tag{1}$$

where F represents the force of spring 112 under the existing degree of compression, $a$ represents the area of the working face of control piston 98, A represents the equal areas of the upper and lower working faces of modulating piston 100, P represents the pressure below piston 100, substantially equal to the inlet pressure, and D represents the difference in pressure below and above piston 100. Equation 1 expresses the fact that the force of spring 112 under the existing degree of compression is equal to the downward force exerted by the pressure on the working face of control piston 98 minus the upward force due to the differential pressure between lower and upper working faces of modulating piston 100. From Equation 1

$$D = \frac{a}{A+a}(P - F/a) \tag{2}$$

The expression $F/a$ represents the pressure that would be required on the working surface of control piston 98 to balance the force F of spring 112. Hence the expression in the parenthesis in Equation 2 may be considered to represent the difference between the actual inlet pressure P and the pressure to which the existing spring position corresponds. That pressure difference is substantially equal to the pressure difference that is maintained across valve 73, which is the difference between the inlet pressure P and the outlet pressure transmitted to the brake under the existing condition of the modulating valve.

An important feature of the present invention is that the pressure differential D across the control orifice 140 is not equal to the pressure drop across valve 73, but is only a small fraction of that value, the fraction being equal approximately to $a/(A+a)$, as shown by Equation 2. When A is much larger than $a$, that fraction is approximately equal to $a/A$. Thus the pressure differential available to move fluid through control orifice 140 is only a small fraction of the difference between the inlet and outlet pressures. The value of that fraction is determined by the detailed design of the apparatus. It may conveniently be made as small as $1/10$, for example.

That fact greatly facilitates the provision of effective control action without requiring that control orifice 140 be impracticably small. For a given value of $a$, which typically corresponds generally to the area of the aperture of valve 73, progressive increase of the area A of the modulating piston facilitates control action not only because of the described reduction of the pressure differential across the control orifice, but also because it increases the volume of fluid that must pass through the control orifice per unit movement of the piston.

To summarize, when the braking pressure metered by the pilot increases rapidly, the action of modulating valve 60 causes the actual pressure delivered to the brake to increase correspondingly to a predetermined critical value, determined primarily by the prestressing of spring 112, and then to increase at a reduced rate the value of which is readily predetermined by such design factors as the spring rate of spring 112, the ratio of piston areas $a/A$ and the dimensions of orifice 140.

If the pilot then maintains a fixed pressure on the control handle of metering valve 40, modulating valve 60 gradually increases the actual brake pressure until it typically becomes substantially equal to the pressure metered by the pilot. Under that stationary condition, the pressure differential across modulating piston 100 disappears, and spring 112 is compressed to such a degree that $$F = aP \tag{3}$$

If, now, the inlet pressure to valve 60 is reduced, either by release of handle 42 by the pilot or by action of antiskid valve 54, that pressure reduction is transmitted at once via passage 136 to control chamber 92, where it produces a differential pressure across modulating piston 100 in a direction urging that piston downward. Particularly when the pressure reduction is abrupt, that disturbs the existing balance, opening valve 73 and permitting the brake pressure to escape promptly from brake line 30 to supply line 62. That reduction of pressure in outlet chamber 70 reduces the upward force on plunger 126, so that the brake releasing action is cumulative. Hence the brake pressure decreases in direct accord with the decreasing inlet pressure without appreciable delay.

When such brake release is due to action of anti-skid valve 54, the incipient skid is typically controlled in a small fraction of a second, after which valve 54 again transmits to inlet line 62 the full pressure being metered by the pilot. Modulating valve 60 promptly transmits that increasing pressure to brake line 30 only up to a critical value determined by the stress of spring 112, as already described. However, under the presently assumed conditions, the stressing of spring 112 is not limited to the prestressing previously mentioned, but corresponds to the existing position of control piston 98. During the few hundred milliseconds that the pressure is ordinarily released to check a skid, that piston moves upward under the force of spring 112 through a distance limited by the rate at which fluid can escape through orifice 140. The rate of such flow is determined by the orifice size and by the pressure differential, as already discussed for the conditions of pressure increase. During release of pressure, the pressure below piston 100 may be taken as zero, and the pressure above that piston is given approximately by the spring force F acting on the total area $A+a$ of the top of the piston. Hence the pressure differential D' is approximately equal to $$D' = F/(A+a) \tag{4}$$

Just prior to pressure release the spring force was typically equal to $aP$, from Equation 3, so that the differential pressure shortly after pressure release is approximately given by $$D' = P\frac{a}{A+a} \tag{4a}$$

That expression, like Equation 2, includes a factor which is approximately equal to the ratio $a/A$, typically much smaller than unity. It is therefore apparent that, during a typical skid-preventing release of the brakes, control piston 98 moves upward only a small distance, producing only a correspondingly small reduction in the stressing of spring 112. Hence when pressure is resupplied to valve 60, that pressure is promptly transmitted to the brake up to a critical value that is typically only slightly less than the value at which the incipient skid occurred. Above that critical value, the rate of pressure increase is modulated by valve 60 in the manner that has already been described. Hence a reasonable time delay is provided before the brake pressure again reaches the value at which the wheel previously started to skid. During that time the brake system and the wheel itself become stabilized, reducing the chance that another skid will follow. And, even if another skid does follow, a useful period of effective braking action has been obtained.

Figures 2A, 3, 4, 5:
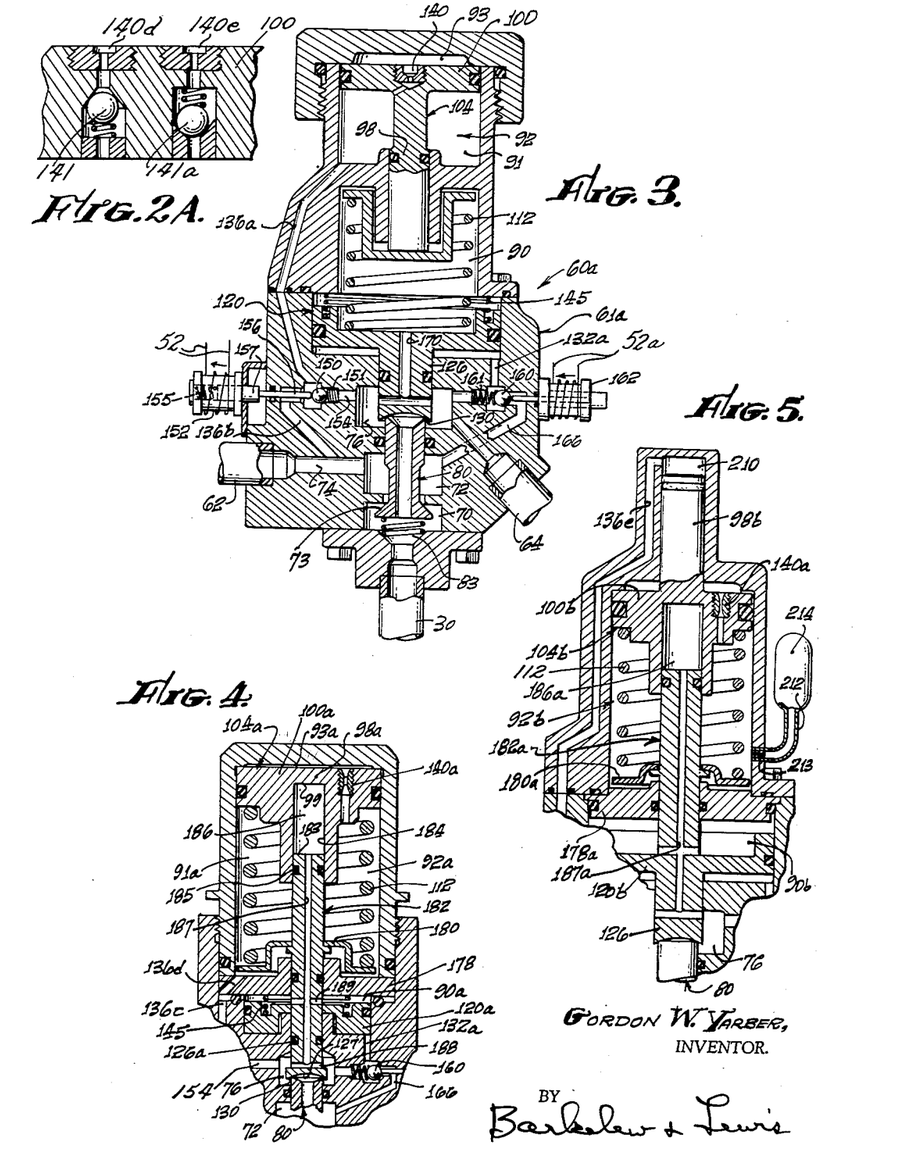
FIG. 2A is a fragmentary section corresponding to a portion of FIG. 2 at enlarged scale, and representing a modification.
FIG. 3 is an axial section representing a brake control mechanism which incorporates the pressure-modulating mechanism of FIG. 2 in combination with valve structure providing skid control functions.
FIG. 4 is an axial fragmentary section representing a modification.
FIG. 5 is an axial fragmentary section representing a further modification.

Orifice 140 may be replaced, if desired, by two distinct orifices 140d and 140e in parallel, provided with respective check valves 141 and 141a oriented in opposite directions, as shown in FIG. 2A, so that one orifice controls limited flow upward through or around piston 100 and the other orifice controls limited flow downward. That arrangement has the advantage that the modulating action of piston 100 during pressure increase can be adjusted by selection of an orifice of suitable size without affecting the modulating action during pressure decrease. That latter action can be independently adjusted by suitable selection of the orifice that controls downward flow.

With the structure as thus far described, there is a possibility that, when the supply pressure is reduced very slowly, it may become less than the existing brake pressure without causing valve 73 to open. Under that condition, the brake pressure would not decrease in direct correspondence to the decrease in supply pressure, but would decrease only by escape through valve 130 to return line 64 in accordance with the upward movement of control member 104. Whereas that type of action may be desirable for certain purposes, it is ordinarily preferable to provide means for insuring that valve 73 will open upon pressure decrease. That may be accomplished, for example, by structure which, under equilibrium conditions, slightly overbalances the upward force exerted by the brake pressure on surface 127.

For that purpose a downward force may be applied to member 120 by either hydraulic or mechanical means, and either directly with respect to housing 61 or through a force exerted via spring 112. For example, the working area of control piston 98 may be made slightly larger than the effective area of surface 127, so that when the brake pressure and inlet pressure are equal, member 120 will be moved downward, opening valve 73. The difference between the two working areas need be only 5 or 10 percent, for example, to accomplish that purpose. However, that arrangement has the potential disadvantage that the net force tending to open valve 73 under equilibrium conditions increases with the pressure. Hence it may be difficult to obtain fully reliable action at low pressures without causing greater overbalance than is desirable at higher pressures.

The present embodiment provides a substantially constant force tending to open valve 73 under equilibrium conditions by means of the spring 145, which is inserted between the upper face of damping piston 122 and the internal shoulder 146 at the base of upper housing member 66. Spring 145 exerts a downward force on member 120 which is sufficient to overcome the light force of spring 83 by an amount corresponding typically to a small fraction, for example approximately $\frac{1}{20}$ to $\frac{1}{10}$ of the prestressed force exerted by control spring 112. That force is substantially constant, since the axial travel of member 120 is small. Whenever the outlet pressure is being controlled by regulatory action of valve 73, spring 145 causes the controlled value of the outlet pressure to be higher than it would otherwise be by an amount corresponding to the spring force. The direct effect of that difference on the braking action is negligible for most practical purposes. However, after a step increase of inlet pressure, for example, the rising outlet pressure reaches equality with the inlet pressure before the differential pressure across modulating piston 100 has decreased quite to zero. As that differential pressure continues to decrease, with further downward movement of control member 104, additional downward force is applied to valve member 80, positively opening valve 73. If, then, the inlet pressure gradually decreases, fluid can escape freely from outlet chamber 70 to inlet chamber 72, so that the fluid pressure on surface 127 decreases in accordance with the fluid pressure, reliably maintaining valve 73 open.

In accordance with a further aspect of my invention, it is highly advantageous to incorporate in the structure of modulating valve 60 means for providing such anti-skid brake control functions as have been described in connection with valve 54 in FIG. 1. A combination modulating and anti-skid valve is shown in one illustrative embodiment in FIG. 3, and will be denoted generally by the numeral 60a. When valve structure 60a is substituted for modulating valve 60 in the system represented in FIG. 1, the anti-skid valve 54, its control mechanism 55 and fluid connection 56 are all typically omitted, and conduits 44 and 62 are connected directly together. Also, the electrical connections indicated at 52 and 52a for supplying the skid signals from sensing means 50 are connected to unit 60a in the typical manner illustrated in FIG. 3. The coordinated structure of FIG. 3 not only combines in a remarkably compact and economical manner both the skid-control functions and the pressure modulating functions that have been described, but utilizes the pressure modulating valve structure to meter the decrease of pressure under certain conditions to be described, in addition to the previously described metering of pressure increases.

The primary working parts of valve 60a of FIG. 3 may typically be the same as have been already described for valve 60 of FIG. 2, and are denoted by the same numerals. The two illustrative structures differ primarily in the provision in FIG. 3 of valve control means in certain fluid passageways, whereby the previously described operation of the modulating valve may be modified in response to suitable control signals from a skid sensing mechanism, such as is represented at 50 in FIG. 1. In the present illustrative embodiment, two such skid control valves are employed, one being inserted in passage 136 of FIG. 2, and the other being inserted in a passage which corresponds to 132 in FIG. 2. Those two skid control valves typically provide two distinct stages of anti-skid control action in response to respective signals from skid sensing mechanism 50 which represent skid conditions of successively increasing severity.

The first step of control action is provided by the valve 150, which is shown in FIG. 3 in its normal position and is shiftable to the left in response to energization of the solenoid 152. Spring 151 maintains the valve ball in contact with the actuating rod 156, which passes in sealed relation through the housing wall. A spring, indicated at 155, engages the solenoid armature 157 and overcomes the relatively light force of spring 151 when the solenoid is not energized. The second stage of anti-skid control is performed by the valve 160, also shown in its normal position in FIG. 3. It is held in that position by spring 161, and is movable to the left, as illustrated, in response to energization of the solenoid 162.

In normal position of valve 150, the passages 136a and 136b are directly connected together, connecting control chamber 92 to inlet passage 74 as in the embodiment of FIG. 2. Upon energization of solenoid 152, valve 150 cuts off passage 136b and connects passage 136a via the transverse connecting passage 154 to return chamber 76. That action occurs in response to a first skid signal on lines 52 from sensing mechanism 50 (FIG. 1), typically at a time when appreciable pressure has been applied to the brake. That is, pressure metered from the pilot's control valve 40 has already moved control piston 98 appreciably downward from its normal position, causing an appreciable braking pressure to be delivered by the modulating valve to brake line 30. Actuation of valve 150 then abruptly reduces the pressure in control chamber 92 from the inlet pressure of line 62 to the relatively low return pressure. A major portion of that pressure reduction is transmitted substantially immediately to upper control chamber 93 above modulating piston 100, since pressure change in that closed chamber requires only negligible flow through orifice 140. The downward force upon the working face of control piston 98 is thereby substantially removed, whereas the upward force exerted by compressed spring 112 continues. A differential pressure D' is thereby established across piston 100 in approximate accordance with Equation 4 above. Accordingly, piston 98 moves upwardly as fast as is permitted by the downward fluid flow through orifice 140 in response to that differential pressure.

That movement is closely similar to the upward movement of the control piston which has already been described in connection with FIG. 2, which occurs in response to an abrupt decrease of inlet pressure. However, in the present instance, the inlet pressure typically remains constant or even increases, depending upon the pilot's action. Hence the previously described prompt release of braking pressure does not occur. Instead, the braking pressure is reduced gradually at a limited rate determined by the upward movement of control piston 98. As that movement relaxes spring 112, reducing the downward force on plunger 126, fluid escapes from brake line 30 through valve 130 into return chamber 76 and return line 64, thereby reducing the brake pressure in direct correspondence to the gradually decreasing tension F of spring 112.

The provision of that metered decrease of brake pressure by the same mechanism that performs the previously described metering pressure increase is highly advantageous. In both instances, the accuracy and reliability of control are distinctly superior to what can be attained, for example, by any mechanism based on a limiting orifice directly in series with the brake. That is particularly true in brake systems in which movement of a small volume of fluid to or from the brake produces a relatively large change in brake pressure. The pressure modulating action of the present invention operates with a relatively large volume of fluid and at a relatively small pressure differential across the control orifice.

If the gradual release of brake pressure produced by actuation of valve 150 is sufficient to check the incipient skid, which is frequently the case, the signal from sensing means 50 ceases and solenoid 152 is released, returning valve 150 to its normal position. The inlet pressure standing in line 62 is thereby immediately reapplied to lower control chamber 91. Piston 98 is thereby moved gradually under modulating control of piston 100 in a direction to restore the braking pressure to the value that corresponds to that inlet pressure. If the inlet pressure has remained constant, for example, that means a gradual increase of pressure, and an appreciable time period is typically required before the brake pressure can again reach the value at which the skid previously occurred.

If the described action of first stage solenoid valve 150 fails to check the incipient skid, sensing means 50 (FIG. 1) delivers via line 52a a second skid signal, energizing second stage solenoid 162 and actuating valve 160. Actuation of valve 160 cuts off passage 132a from return chamber 76 and connects it instead via the oblique passage 166 to inlet chamber 72. That action applies the full available pressure from supply line 62 to the lower side of piston 120, the working area of which is large compared to that of control piston 98. In the present modification, the portion of chamber 90 above piston 120 is not connected through the piston to the lower portion of the chamber, as in the modification of FIG. 2, but is instead in constant communication with return pressure. Such connection may, for example, be provided by the inverted T-shaped passage structure indicated at 170 in FIG. 3. With that typical arrangement, actuation of second step anti-skid valve 160 produces an upward force on piston 120 that easily overcomes the opposite force of spring 112, moving plunger 126 rapidly and positively upward to the limit of its available movement. Valve member 80 follows upwardly under the light force of spring 83 until checked by seating of valve 73. Continuing upward movement of plunger 126 opens valve 130, releasing the brake pressure quickly to return line 64.

That complete release of the brake reliably checks the incipient skid. As the wheel returns to normal speed, the skid signals on lines 52 and 52a are terminated, releasing the respective solenoids and returning the valves 150 and 160 to their normal positions, as illustrated in FIG. 3. The pressure differential across piston 120 is thereby eliminated, and inlet pressure is resupplied to lower control chamber 91. The existing residual compression of spring 112 promptly drives piston 120 downward, closing valve 130 and opening valve 73. The latter valve remains open until the brake pressure in line 30 is restored to the critical value corresponding to the existing degree of stress of spring 112.

Since modulating piston 100 has been moving upwardly under the force of spring 112 during the entire skid-control action by both valves 150 and 160, that critical brake pressure is typically appreciably lower than the pressure which initiated the incipient skid. On the other hand, it is typically still considerably higher than the value corresponding to full extension of spring 112. Hence the brake receives promptly a degree of pressure which is effective to perform useful braking action. That pressure is then gradually increased at the limited rate set by action of modulating piston 100, as already described. It will be noted that, the more severe the tendency to skid, and hence the longer the duration of the anti-skid action of valves 150 and 160, the greater the reduction in the value of braking force which is immediately reapplied, as compared to the value which produced the skid. That feature of the performance is highly desirable, since it leads automatically to prompt resupply of the maximum breaking force that is likely to be effectively usable without again producing an incipient skid.

A further illustrative embodiment of the invention is shown schematically in FIG. 4. The modification of FIG. 4 provides functional operation which is typically essentially identical to that of FIG. 3, but with certain structural advantages, including, in particular, desirable economy of space in the axial direction. The lower portion of the structure of FIG. 4, including valve member 80, valves 150 and 160 and the immediately associated chambers and passages, is typically identical in arrangement and operation to that of FIG. 3, and does not require repeated illustration and description. The two forms differ primarily in the location of spring 112 and in the construction of the control member. In the embodiment of FIG. 4, spring 112 is placed above the transverse housing web 178 in the same chamber 92a with the control piston and modulating piston. The damping and brake release piston 120a is housed in a chamber 90a below web 178, which chamber may be relatively small in the axial direction, since the axial movement of that piston corresponds only to the short axial travel of valve member 80.

The control member 104a of FIG. 4 comprises a unitary piston structure axially movable in cylindrical control chamber 92a. Control member 104a directly engages the upper end of spring 112, and controls the degree of compression of that spring. Fluid pressure is supplied to lower control chamber 92a via the housing passage 136c and the oblique passage 136d in web member 178. Passage 136c communicates directly with the chamber of anti-skid valve 150, and receives pressure under control of that valve in the manner already described for passage 136a of FIG. 3. The lower portion 91a of control chamber 92a below piston 100a and the upper portion 93a above piston 100a are connected together via a flow limiting orifice shown schematically at 140a within the body of the piston member. The radially outer portion of control member 104a thus corresponds to modulating piston 100 of FIG. 3, and is denoted by the numeral 100a. The action of that piston will be fully understood from the previous description.

The lower end of control spring 112 is supported by the bracket 180 which is mounted on the member 182. Member 182 is axially movable in aligned bores in web member 178 and in the housing web between chambers 76 and 90a. The lower portion of member 182 comprises the valve actuating plunger 126a, and corresponds in structure and function to plunger 126 of FIG. 3. Its intermediate portion fixedly carries the damping and skid control piston 120a in chamber 90a. The axial position of member 182 controls valves 73 and 130 and is determined essentially by the existing relationship between the downward force exerted on it by control spring 112 and the upward force exerted on its lower face 127 by fluid pressure from outlet chamber 70. The upper end of member 182 is slidingly received in a cylindrical axial bore 184 in control member 104a, thus forming a piston which works in the cylinder 186. Pressure in that cylinder is maintained equal to the substantially uniform pressure of return chamber 76, providing a uniform downward pressure on the upper end face 183 of member 182 and a uniform upward pressure on the upper end face 99 of the cylinder. That uniform pressure is illustratively supplied by the axial passage 187, which extends nearly the entire length of member 182 and terminates in the transverse passage 188 which opens into return chamber 76. A second transverse passage 189 supplies return pressure to the upper portion of chamber 90a above piston 120a, thus corresponding in function to the passage 170 of FIG. 3.

The upper end face 99 of cylinder 186 may be considered to constitute the lower working face of the control piston of the present embodiment, indicated at 98a. The upper working face of that piston is then the central portion of the upper face of control member 104a directly above surface 99 and equal to that surface in area. Accordingly, piston 98a is subject to a downward force equal to the difference between the pressure in upper control chamber 93a and the return pressure in cylinder 186. The resulting forces developed by piston 98a thus correspond directly to the previously described action of control cylinder 98 of FIG. 3.

A further illustrative embodiment of the invention is represented schematically in FIG. 5. The embodiment in FIG. 5 employs the spring location already described in connection with FIG. 4, in combination with further structural features which provide certain advantages of a structural nature and also produce illustrative modification of the functional operation of the device. The lower portion of the structure of FIG. 5 is illustratively considered to be identical with corresponding parts of FIG. 3, and is not repeated.

In FIG. 5 the housing web member 178a separates control chamber 92b from chamber 90b in which the damping and skid control piston 120b is axially movable. That piston is formed as an integral part of the member 182a. The lower end of that member comprises the valve actuating plunger 126, which extends into outlet chamber 76 and engages valve member 80 as already described in connection with FIG. 3. The intermediate portion of member 182a extends in sealed reciprocable relation through an axial bore in housing web member 178a, and supports the lower end of control spring 112 in control chamber 92b by means of the spring bracket 180a. The upper end of member 182a is slidingly received in sealed relation in an axial bore in control member 104b, in a manner similar to that explained in connection with FIG. 4. The piston chamber 186a thus formed in member 104b is supplied with uniform pressure, typically return pressure supplied via the axial passage 187a, as in the modification of FIG. 4. With that typical structure, fluid pressure variations in chamber 92b exert force on member 182a only via control spring 112. Also, the valve actuating movement of member 182a and the far greater movement of control piston 98b, to be described, do not change the effective total volume of chamber 92b.

Control member 104b in FIG. 5 comprises the modulating piston 100b, which is reciprocable within the cylindrical chamber 92b and directly engages the upper end of spring 112. Piston 100b is provided with a flow limiting orifice 140a, illustratively shown as in FIG. 4. In the present embodiment, the control piston works in a cylinder in which the fluid pressure may be varied independently of the pressure in modulating chamber 92b. As illustrated, control piston 98b comprises an integral part of control member 104b, extending upwardly from modulating piston 100b and working in a cylinder 210 formed by an axial housing bore. Fluid pressure is supplied to cylinder 210 via the passage 136e which communicates with the chamber of valve 150, controlled in the manner already described. Hence pressure in cylinder 210 normally equals the inlet pressure, but is switched by valve 150 to the return pressure in response to a skid signal.

An important characteristic of the present embodiment is the fact that control chamber 92b is entirely isolated from the rest of the fluid system. Under that condition, modulating piston 100b can perform the various types of pressure modulating control that have been described with substantially any arbitrary value of average or equilibrium fluid pressure in chamber 92b. That chamber may, for example, be filled with liquid fluid and completely sealed. However, it is ordinarily desirable to provide means for compensating such effects as temperature variation to prevent excessive changes of pressure. For most applications, that can conveniently be accomplished, for example, by providing passage means permitting relatively slight fluid movement between the chamber and a source of uniform pressure. For example, a passage may be provided through web member 178a to chamber 90b which is at return pressure, that passage being restricted by a limiting orifice which is preferably small compared to the normal control orifice 140a. As illustrated in FIG. 5, a temperature compensating mechanism is provided which does not require communication with other parts of the mechanism. A side conduit 212 is provided, opening through the side wall of chamber 92b outside the range of travel of piston 100b, and containing a flow limiting orifice indicated schematically at 213. Conduit 212 leads to an accumulator 214, which may be of conventional construction and which is of sufficient capacity to accommodate all anticipated changes of volume of the fluid in chamber 92b. Orifice 213 is made sufficiently small that the flow through it during pressure modulating action of the device is too small to appreciably affect the degree of compression of control spring 112. Even a very small orifice may provide ample flow for compensating fluid expansion with temperature changes, for example.

An advantage of the substantial isolation of chamber 92b from the rest of the fluid system, as shown illustratively in FIG. 5, is that the fluid employed as operating medium for modulating piston 100b may be different from that employed in the remainder of the system. For example, in connection with a hydraulic brake system, it may be desirable for modulating piston 100b to operate in a liquid medium having different characteristics from the hydraulic fluid. In particular the modulating action of a piston of given dimensions with a given limiting orifice can be increased by utilizing a fluid of higher viscosity.

Furthermore, the embodiment of FIG. 5 is illustrative of the utility of the present invention for improving the operation of pneumatic brake systems, such as are commonly used for operating the brakes of railroad trains, many highway vehicles, and some aircraft. The previously described illustrative embodiments are not suitable for use in systems which utilize pneumatic fluids such as air, for example, since satisfactory action by the modulation piston requires that it act in a substantially incompressible medium. With the type of structure shown illustratively in FIG. 5, the modulating piston may act in an incompressible fluid, such as any of the well known hydraulic liquids, for example, while the remainder of the system is operated by a gas.

Thus, for example, FIG. 1 may be considered to represent a typical pneumatic brake control system. The modulating valve indicated at 60 of FIG. 1 may then be of the form illustrated in FIG. 5, the skid control valves 150 and 160 being omitted as in FIG. 2. Also, the structure of FIG. 5, including valves 150 and 160 as in FIG. 3, may constitute both the modulating means 60 and the skid control means 54 and 55 of FIG. 1. In either instance, all of the return lines 34, 45, 56 and 65 are, of course, unnecessary, since air from the system can conveniently be vented to the atmosphere and pump 32 can compress air from the same suorce for delivery via pressure line 36.

A further advantage of the type of construction illustrated in FIG. 5 is that the relatively high supply pressure from line 62 is utilized only in cylinder 210 and, when anti-skid control is combined in the same mechanism, for lifting piston 120b. Since the remainder of the mechanism is subjected only to relatively low pressures, the construction can be correspondingly light, saving weight of the finished product and reducing the manufacturing cost.

During pressure modulating action of the embodiment of FIG. 5, control element 104b is moved under control of the supply pressure in a manner similar to that already described in connection with previous embodiments. During increase of the supply pressure transmitted by line 136e to control cylinder 210, for example, the substantial balance between the spring force F and the fluid forces acting on the control member at any point of its downward movement may be expressed by the equation:

$$F = aP - AD \qquad (5)$$

where the first term on the right represents the downward force on the top of control piston 98b, and the second term represents the upward force produced by differential pressure D acting on the working faces of control piston 100b. From Equation 5, $$D = \frac{a}{A}(P - F/a) \qquad (6)$$

When a/A is small, Equations 5 and 6 are not greatly different from 1 and 2, respectively. Similarly, Equations 4 and 4a, previously discussed in connection with upward movement of the control element, may be made applicable to the present embodiment by replacing the term A+a by A.

Figure 6:
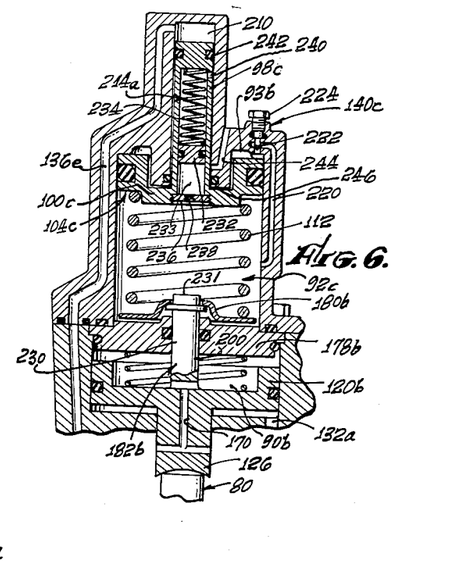
FIG. 6 is an axial fragmentary section representing a further modification.

FIG. 6 represents a further illustrative embodiment of the invention, which, like FIG. 5, is suitable for use in both liquid and pneumatic brake systems. Those portions of FIG. 6 not specifically described may be constructed and operate substantially as in the embodiment of FIG. 5.

As in the previously described embodiments, means are provided for restricted fluid flow from one side to the other of the modulating piston 100c. In the structure of FIG. 6, such means, indicated generally at 140c, are provided as a part of the housing and comprise the passage 220 and the valve 222. That valve limits flow through passage 220 and is adjustable from outside the housing as by the screw 224. Such readily accessible adjustment of the control orifice may be provided in the previously described embodiments, and has the advantage that the modulating action of the device may be varied conveniently in accordance with operating conditions.

In FIG. 6 the member 182b, which otherwise corresponds generally with member 182a of FIG. 5, is cut off above spring bracket 180b. The upper face 231 of that member is thus exposed to the fluid pressure in the lower portion of chamber 92c below control member 104c. The resulting downward force equals that pressure multiplied by the working area of member 182b where is passes through housing web 178b. That portion of member 182b thus acts as a piston, which will be denoted by the numeral 230. The force on working face 231 of piston 230 is transmitted to valve actuating plunger 126 directly, not merely through variation in the stress of control spring 112. The magnitude of that force may be varied within wide limits in design of the mechanism by suitable selection of the effective piston area. In FIG. 6 that area is illustratively shown somewhat smaller than the working area of control piston 98c.

FIG. 6 includes an illustrative representation of an accumulator, indicated generally by the numeral 214a and corresponding in part to accumulator 214 of FIG. 5. For economy of space, accumulator 214a is constructed in the interior of control member 104c, utilizing space which was partially employed in FIG. 5 for cylinder 186a. An axial chamber 233 is formed in that member, opening through the lower face of piston 100c. A piston 232 is axially slidable in chamber 233 and is urged downwardly by the spring 234. The mouth of chamber 233 is nearly completely blocked against fluid flow by the fitting 236, which is secured in sealed relation and through which a very small orifice is provided, as indicated at 238. That orifice preferably permits considerably less flow, for a given pressure differential, than the control orifice at valve 222. The portion of chamber 233 above piston 232 is filled with air, which is maintained at atmospheric pressure as by a vent of any suitable type. As shown, a passage is provided at 240 through the side wall of chamber 233 just below the upper sealing means 242 of piston 98c; and a passage to the atmosphere is provided through the housing wall at 244 just above the lower sealing means 246. For economy of space, upper sealing means 242 typically comprises an O-ring set in the periphery of piston 98c, while lower sealing means 246 comprises an O-ring set in the housing wall. The normal clearance of a few mils, for example, between the wall of piston 98c and the housing between those O-rings provides sufficient air flow between passages 240 and 244 for the present purpose. Chamber 92c and also the lower portion of compensating chamber 233 below piston 232 are filled with a suitable liquid fluid. As that fluid expands, for example in response to rising temperature, compensating piston 232 is moved upward against the force of spring 234, maintaining substantially uniform pressure under equilibrium conditions of the mechanism. Such movement of piston 232 also compensates for the changes in total volume of chamber 92c, on both sides of piston 100c, that result from axial movement of control piston 98c and of piston 230. It will be noted that the volume change due to movement of piston 230 is small, due to its short travel. And the volume change of chamber 92c due to movement control piston 98c, while appreciable, is typically much less than the accompanying flow through orifice 140c.

In the illustrative structure of FIG. 6, the lower face of control piston 98c is exposed to the fluid pressure in the lower part of chamber 92c, variation of which corresponds substantially to the differential pressure D, already discussed. Hence the force balance for FIG. 6 corresponds to Equations 1 and 2, rather than to Equations 5 and 6.

The pressure in the lower part of chamber 92c also acts, as already indicated, on piston 230, which constitutes a part of member 182b. The constant portion of that force, corresponding to the substantially constant tension of compensating spring 234, has an effect on the valve action which is substantially equivalent to an increase in the prestress force of main control spring 112. That action can readily be taken into account in design of the mechanism.

The variable part of the pressure on piston 230 corresponds, essentially, during downward movement of control member 104c, to the differential pressure D, already discussed. The resulting force on piston 230 is transmitted directly to valve actuating plunger 126 and thus acts immediately on valve member 80, increasing the fluid pressure which is transmitted to the brake via valve 73 (FIG. 3). That prompt action by piston 230 is clearly distinct from the described actions of the various forces upon control member 104c, which can affect the actual brake pressure only through movement of control spring 112. The force on piston 230, on the other hand, acts in parallel with the force exerted by the lower end of spring 112, and is functionally equivalent to a variation in stress of that spring. That effective change of spring stress occurs, however, without alteration of the actual degree of spring compression.

In general, the described force on piston 230 has the effect, during metered increase of the brake pressure, of increasing the actual brake pressure by a definite increment. That increment is directly proportional to the differential pressure D, which may be considered as a measure of the extent to which modulating piston 100c causes the brake pressure to lag behind the supply pressure metered to supply line 62 by the pilot. Thus, when the pressure metered by the pilot increases rapidly, the described force on piston 230 has the effect of causing the actual brake pressure to follow that increase more closely than otherwise would be the case. However, that action does not alter the movement of control member 104c, and is therefore quite distinct from any design modification which would cause that movement to take place more rapidly.

The described effect is particularly clearly evident during initial application of the brake. In the previous embodiments, the increasing pressure from supply line 62 is then transmitted promptly to the brake only up to a value corresponding to the prestressing of spring 112. Above that value, the brake pressure increases only as the control member moves downward to increase the spring stress. In the present embodiment, on the other hand, the increasing supply pressure is transmitted promptly to the brake up to a value which corresponds to the prestressing of spring 112 plus a predetermined proportion of the excess of the metered pressure over that prestressed volume. During normal brake application that pressure excess is typically only moderate and the described effect causes little practical change in the braking action. However, if the pilot suddenly meters substantially full brake pressure, for example in response to an emergency, the described action of the differential pressure on piston 230 may significantly accelerate the supply of pressure to the brake. The magnitude of that effect can readily be determined in design of the device by suitable selection of the working area of piston 230.

Many further modifications may be made in the specific structures that have been described without departing from the scope of the present invention, which scope is defined by the appended claims. For example, the slidable pistons shown are representative of fluid power means of any suitable type, it being recognized in the art that other structures, such as flexible diaphragms which are deformable in response to fluid pressure, may be utilized to couple fluid and mechanical systems.

In systems in which only a single skid signal is available from sensing mechanism 50, that signal can be effectively utilized to energize both solenoids 152 and 162, which may be connected in parallel, for example; or to actuate any valve mechanism performing an equivalent function. The brake is then released by actuation of valve 160 or its equivalent, while control piston 104 is caused to move upward at a limited rate by the actuation of valve 150 or its equivalent. Upon termination of the single skid signal, the mechanism then performs the same modulating action as described upon termination of the two signals.

Modifications that have been described illustratively with relation to one embodiment may be applied in most instances to other embodiments.

I claim:

1. In a control system for a vehicle wheel brake that is normally actuable in response to a variable fluid pressure, said system comprising a supply line and means actuable manually to supply a selected fluid pressure to the supply line to actuate the brake; the improvement which comprises the combination of pressure regulating valve means having an input connected to the supply line and an output connected to the brake, said pressure regulating valve means comprising a valve and a valve actuating member normally acting to control the output pressure in accordance with a control force applied to the valve actuating member, means responsive to fluid pressure for applying a control force to the valve actuating member, and conduit means acting independently of the condition of said valve to supply a variable fluid pressure to said pressure responsive means, said pressure responsive means including limiting means normally acting to limit the rate of variation of the control force.

2. The combination defined in claim 1 and including means acting to prevent the control force from decreasing below a predetermined minimum value.

3. In a control system for a vehicle wheel brake that is normally actuable in response to a variable fluid pressure, said system comprising a supply line and means actuable manually to supply a selected fluid pressure to the supply line to actuate the brake; the improvement which comprises the combination of pressure regulating valve means having an input connected to a source of fluid pressure and an output connected to the brake, said pressure regulating valve means comprising a valve and a valve actuating member normally acting to control the output pressure in accordance with a control force applied to the valve actuating member, a movable control member, stressible resilient means interconnecting the control member and the valve actuating member and exerting on the latter a force that varies with the position of the control member, and means for moving the control member in response to variations in the pressure in the supply line.

4. In a control system for a vehicle wheel brake that is normally actuable in response to a variable fluid pressure, said system comprising a supply line and means actuable manually to supply a selected fluid pressure to the supply line to actuate the brake; the improvement which comprises the combination of pressure regulating valve means having an input connected to a source of fluid pressure and an output connected to the brake, said pressure regulating valve means comprising a valve and a valve actuating member normally acting to control the output pressure in accordance with a control force applied to the valve actuating member, structure forming a cylinder, a piston movable in the cylinder, resilient means coupling the piston and the valve actuating member, conduit means for supplying to the cylinder a fluid pressure derived from the supply line pressure, and means acting to limit the rate of movement of the piston.

5. The combination defined in claim 4 and including also sensing means responsive to wheel deceleration, second conduit means communicating with a source of relatively low pressure, valve means actuable to isolate the cylinder from the first said conduit means and to connect it to the second conduit means, and means for actuating the valve in response to the sensing means.

6. In a control system for a vehicle wheel brake that is normally actuable in response to a variable fluid pressure, said system comprising a supply line and means actuable manually to supply a selected fluid pressure to the supply line to actuate the brake; the improvement which comprises the combination of pressure regulating valve means having an input connected to the supply line and an output connected to the brake, said pressure regulating valve means comprising a valve and a valve actuating member normally acting to control the output pressure in accordance with a control force applied to the valve actuating member, structure forming a cylinder, a piston movable in the cylinder, resilient means coupling the piston and the valve actuating member, conduit means connecting the portions of the cylinder on opposite sides of the piston for limited fluid flow therebetween, and means for applying to the piston a force that varies in response to the input pressure.

7. The combination defined in claim 6, and in which the last said means comprises structure forming a second cylinder having a smaller working area than the first said cylinder, a second piston movable in the second cylinder, means coupling the pistons with respect to their said movements, and means for supplying to the second cylinder a pressure derived from the supply line pressure.

8. The combination defined in claim 6, and wherein said conduit means comprises structure forming two distinct orifices connected in parallel, and a check valve in series with at least one of said orifices.

9. The combination defined in claim 6, and including damping means for the valve actuating member, said damping means comprising structure forming a second cylinder, a damping piston movable in the second cylinder, and coupled to the valve actuating member, and conduit means connecting the portions of the second cylinder on opposite sides of the damping piston for limited fluid flow therebetween.

10. The combination defined in claim 6 and including means acting independently of said resilient means to exert upon the valve actuating member a yielding force of substantially constant magnitude.

11. Control means for modulating the action of a vehicle wheel brake which is normally actuable in response to fluid pressure manually metered to the brake via a supply line; said control means comprising valve means having a supply port connected to the supply line, a brake port connected to the brake, and a release port connected to a source of relatively low pressure, a valve actuating member movable in one direction to connect the brake port to the supply port and movable in the other direction to connect the brake port to the release port, stressible resilient means acting when stressed to yieldably urge the member in said one direction, means urging the member in the other direction under control of the pressure at the brake port, and stressing means for variably stressing the resilient means under control of the pressure in the supply line.

12. Brake control means as defined in claim 11 and including also skid sensing means responsive to abnormal wheel deceleration and skid control means actuable under control of the sensing means to disable said stressing means and to release the stressing of the resilient means at a predetermined limited rate.

13. Brake control means as defined in claim 11 said stressing means including means acting to maintain the stress of the resilient means in excess of a predetermined minimum value independently of the pressure in the supply line.

14. Brake control means as defined in claim 11, the last mentioned means including means acting to limit the rate at which the stressing of the resilient means can increase.

15. Control means for modulating the action of a vehicle wheel brake which is normally actuable in response to fluid pressure manually metered to the brake via a supply line; said control means comprising valve means having a supply port connected to a source of fluid pressure, a brake port connected to the brake, and a release port connected to a source of relatively low pressure, a valve actuating member movable in one direction to connect the brake port to the supply port and movable in the other direction to connect the brake port to the release port, stressible resilient means acting when stressed to yieldably urge the member in said one direction, means urging the member in the other direction under control of the pressure at the brake port, structure forming a cylinder, a piston movable in the cylinder in one direction to stress the resilient means and in the other direction to relieve said stress, conduit means connecting the portions of the cylinder on opposite sides of the piston for limited fluid flow therebetween, and stressing means normally yieldably urging the piston in said one direction in response to pressure in the supply line to stress the resilient means.

16. Control means as defined in claim 15 and including power means coupled to said member and actuable in response to fluid pressure to exert a yieldable force on said member in said one direction independently of the resilient means, and means for supplying to the power means a pressure responsive to the differential pressure on opposite sides of said piston.

17. Control means as defined in claim 15 and including sensing means responsive to wheel deceleration, and power means actuable in response to the sensing means to move the member in said other direction against the force of the resilient means.

18. Control means as defined in claim 15 and including also sensing means responsive to wheel deceleration, and means acting under control of the sensing means to disable said stressing means.

19. Control means for modulating the action of a vehicle wheel brake which is normally actuable in response to fluid pressure manually metered to the brake via a supply line; said control means comprising valve means having a supply port connected to the supply line, a brake port connected to the brake, and a release port connected to a source of relatively low pressure, a valve actuating member movable in one direction to connect the brake port to the supply port and movable in the other direction to connect the brake port to the release port, stressable resilient means acting when stressed to yieldably urge the member in said one direction, means urging the member in the other direction under control of the pressure at the brake port, means for variably stressing the resilient means under manual control, and skid control means comprising power means coupled to said member and actuable in response to fluid pressure to move the member in said other direction against the force of the resilient means, sensing means responsive to wheel deceleration, and valve means actuable under control of the sensing means to supply fluid pressure from the supply line to said power means to actuate the same.

20. In a control system for a vehicle wheel brake that is normally actuable in response to a variable fluid pressure, the combination of valve structure forming a supply port connected to a source of fluid pressure, a brake port connected to the brake and a release port connected to a source of relatively low pressure, a valve actuating member movable in one direction to connect the brake port to the supply port and movable in the other direction to connect the brake port to the release port, means urging the valve actuating member in said other direction under control of the pressure at the brake port, stressable resilient means engaging the valve actuating member and acting when stressed to exert a yielding force on the valve actuating member in the first said direction, a movable control member coupled to the resilient means to variably stress the same in accordance with the position of the control member, means acting to limit the rate of movement of the control member, and means actuable under manual control to exert upon the control member a yielding force in a direction to stress the resilient means.

21. The combination defined in claim 20, and wherein the last said means comprises structure forming a cylinder, a piston movable in the cylinder and positively coupled to the control member, conduit means normally connecting the cylinder and the supply port, and means actuable manually to vary the pressure at the supply port.

22. The combination defined in claim 21, and including also antiskid valve means actuable to isolate the cylinder from the supply port and to connect the cylinder and the release port, sensing means responsive to wheel deceleration, and skid control means for actuating the antiskid valve means under control of the sensing means.

23. The combination defined in claim 20, and wherein said means acting to limit the rate of movement of the control member comprises structure forming a cylinder, a piston movable in the cylinder and positively coupled to the control member, and restricted conduit means for limiting the rate of flow of fluid displaced by movement of the piston.

24. The combination defined in claim 20 and including also structure defining a working surface on the valve actuating member, means for supplying to the working surface a fluid pressure substantially equal to that at the outlet port to urge the valve actuating member in said other direction, and means acting independently of said resilient means to exert upon the valve actuating member a yielding force of substantially constant magnitude in said one direction.

25. In a control system for a vehicle wheel brake that is normally actuable in response to a variable fluid pressure, the combination of valve structure forming a supply port connected to a source of fluid pressure, a brake port connected to the brake and a release port connected to a source of relatively low pressure, a valve actuating member axially movable in one direction to connect the brake port to the supply port and movable in the other direction to connect the brake port to the release port, an axially movable control member, stressable resilient means coupling the control member and the valve actuating member and acting when stressed to exert a yielding force on the latter in the first said direction, structure defining first and second working surfaces of substantially equal area on the valve actuating member and on the control member, respectively, means for supplying to the first working surface a fluid pressure substantially equal to that at the outlet port to urge the valve actuating member in said other direction, means for supplying to the second working surface a fluid pressure that is variable under manual control to urge the control member in a direction to stress the resilient means, structure forming a cylinder, a piston movable in the cylinder and positively coupled to the control member, and restricted conduit means for limiting the rate of flow of fluid displaced by movement of the piston, the working area of the piston being large compared to said working surfaces.

26. In a control system for a vehicle wheel brake that is normally actuable in response to a variable fluid pressure, the combination of valve structure forming a supply port connected to a source of fluid pressure, a brake port connected to the brake and a release port connected to a source of relatively low pressure, a valve actuating member movable in one direction to connect the brake port to the supply port and movable in the other direction to connect the brake port to the release port, means urging the valve actuating member in said other direction under control of the pressure at the brake port, structure forming a cylinder, a piston movable in the cylinder, an elongated member positively coupled to the valve actuating member and extending axially into the cylinder, the end portion of the elongated member forming a plunger that is slidingly received in a closed axial bore in one face of the piston, bracket means fixedly mounted on the elongated member within the cylinder, a coaxial coil spring coupling the bracket means and the piston, first conduit means for fluid flow between the axial bore inward of the plunger and a source of substantially uniform pressure, second conduit means normally supplying fluid pressure from the supply port to at least that portion of the other face of the piston that is opposite said axial bore, and restricted conduit means for limiting the rate of flow of fluid displaced by movement of the piston.

27. In a control system for a vehicle wheel brake that is normally actuable in response to a variable fluid pressure, the combination of a supply line communicating with a source of fluid pressure, valve structure forming a supply port connected to the supply line, a brake port connected to the brake and a release port connected to a source of relatively low pressure, a valve member axially movable between brake actuating and brake arresting positions in which the supply port is connected to the brake port, and is isolated therefrom, respectively, a valve actuating member axially movable into and out of engagement with the valve member, said engagement tending to move the valve member toward its brake actuating position, structure forming passage means for fluid flow between the brake port and the release port, valve means acting to close the passage means in response to said engagement of the valve actuating member and the valve member, means urging the valve actuating member away from the valve member under control of the pressure at the brake port, stressable resilient means engaging the valve actuating member and acting when stressed to urge the latter yieldably toward engagement with the valve member, a control member movable in one direction to stress the resilient means and in the other direction to release the stress thereof, means acting to limit the rate of movement of the control member, and brake actuating means actuable under manual control to exert upon the control member a yielding force in the direction to stress the resilient means.

28. The combination defined in claim 27 and including also, sensing means responsive to wheel deceleration, and means actuable under control of the sensing means to move the valve actuating member against the force of the resilient means out of engagement with the valve member.

29. The combination defined in claim 27 and including also sensing means responsive to wheel deceleration, and means actuable under control of the sensing means to disable said brake actuating means and to exert on the control member a yielding force in the direction to release the stress on the resilient means.

30. In a control system for a vehicle wheel brake that is normally actuable in response to fluid pressure, the combination of a source of fluid pressure, pressure regulating valve means connected between the pressure source and the brake and including a movable control member and means normally biasing the valve means toward open position with a yielding force that increases with movement of the control member in one direction, means actuable to move the member in said one direction to transmit pressure to the brake, sensing means responsive to an incipient skid of the wheel, and skid control means acting under control of the sensing means to move the member in the other direction to reduce the pressure transmitted to the brake.

31. In a control system for a vehicle wheel brake that is normally actuable in response to fluid pressure, the combination of a source of fluid pressure, pressure regulating valve means connected between the pressure source and the brake and including a movable control member and means normally biasing the valve means toward open position with a yielding force that increases with movement of the control member in one direction, means actuable to move the member in said one direction to transmit pressure to the brake, sensing means responsive to an incipient skid of the wheel, and skid control means acting under control of the sensing means to disable said biasing means.

32. A control system as defined in claim 31, and including also means acting under control of the sensing means to move the member in the other direction.

33. In a control system for a vehicle wheel brake that is normally actuable in response to a variable fluid pressure, said system comprising a supply line and means actuable manually to supply a selected fluid pressure to the supply line to actuate the brake; the improvement which comprises the combination of pressure regulating valve means having an input connected to a source of fluid pressure and an output connected to the brake, said pressure regulating valve means comprising a valve and a valve actuating member normally acting to control the output pressure in accordance with a control force applied to the valve actuating member, structure forming a cylinder, a piston movable in the cylinder, resilient means coupling the piston and the valve actuating member, and conduit means for supplying to the cylinder a pressure derived from the supply line pressure.

References Cited in the file of this patent

UNITED STATES PATENTS

| | | |
|---|---|---|
| 1,041,091 | Johnson | Oct. 15, 1912 |
| 2,400,688 | Eaton | May 21, 1946 |